United States Patent [19]

Kurata

[11] Patent Number: 4,570,186
[45] Date of Patent: Feb. 11, 1986

[54] BINARY TRANSFORMATION METHOD
[75] Inventor: Masami Kurata, Kanagawa, Japan
[73] Assignee: Fuji Xerox Co., Ltd., Tokyo, Japan
[21] Appl. No.: 444,255
[22] Filed: Nov. 23, 1982
[30] Foreign Application Priority Data Dec. 4, 1981 [JP] Japan ................................ 56-194438

[51] Int. Cl.⁴ .............................................. H04N 1/40
[52] U.S. Cl. ................................................ 358/282
[58] Field of Search ........................ 358/280, 282, 284
[56] References Cited

U.S. PATENT DOCUMENTS

| | | | |
|---|---|---|---|
| 4,271,436 | 6/1981 | Kurose et al. ....................... | 358/284 |
| 4,345,314 | 8/1982 | Melamud et al. ................... | 358/284 |
| 4,349,846 | 9/1982 | Sekigawa ............................ | 358/280 |
| 4,389,677 | 6/1983 | Rushby et al. ...................... | 358/280 |

Primary Examiner—Edward L. Coles, Sr.
Attorney, Agent, or Firm—Sughrue, Mion, Zinn, Macpeak, and Seas

[57] ABSTRACT

A method of transforming an image of a document into a binary signal. Each pixel of the document is read and expressed in terms of a signal having one of eight levels. This signal is compared with the signals of the immediately adjacent pixels. A new level is assigned to the given pixel according to the formula $$D' = 3D_0 - D_1 - D_2 \ldots - D_N.$$

This new level is then compared to a reference level, and the signal is binary-coded accordingly.

4 Claims, 15 Drawing Figures

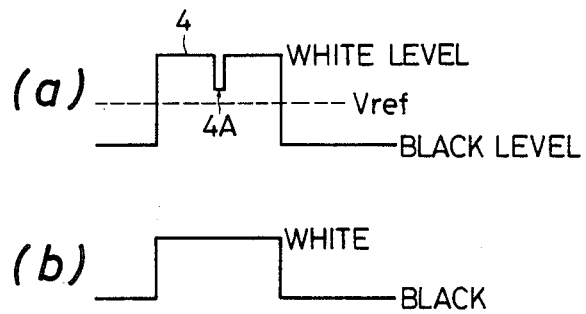
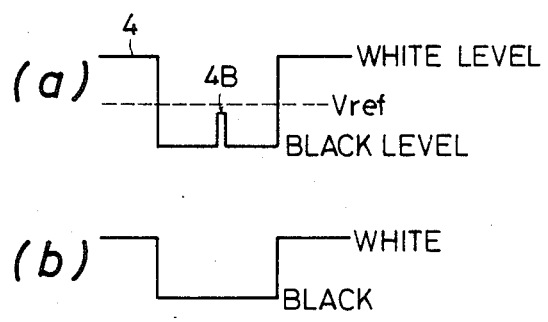

BINARY TRANSFORMATION METHOD

BACKGROUND OF THE INVENTION

The present invention relates to a method of transforming an analog signal read out by an image sensor within a reading section, a facsimile device, or the like, into a binary signal.

In a reading apparatus in which real picture information is read by a linear image sensor, the transformation of an analog signal into a binary signal is effected for every main scanning line in accordance with the light and dark (i.e. white and black) portions of an original document.

FIG. 1 is a block diagram explaining the principle of the binary transformation of an analog image signal in a conventional reading apparatus. An analog picture signal 2 produced from an image sensor 1 is applied to an automatic background control circuit 3. The automatic background control circuit 3 is a type of automatic gain control (AGC) circuit which serves to cause the levels of the background (i.e. white) regions to coincide with each other in each image. An analog picture signal 4 from the background control circuit 3 is compared by a comparator 5 with a threshold voltage $V_{ref}$ which is a reference value for the binary transformation. As a result of this comparison, a binary-transformed signal 6 is produced which corresponds to light and dark portions of the original document.

FIG. 2 shows a resolution characteristic in such a binary transformation method. In FIG. 2, the ordinate represents the modulation transfer function (MTF) and the abscissa represents the line density. As seen in FIG. 2, as the line density increases, the contrast between the white portion and the black portion of a picture image decreases. This decrease is due to the respective resolution characteristics of the image sensor and its associated focusing lens (which focuses the light image onto the image sensor). As a result, it becomes impossible to divide the picture signal into two values, i.e., white and black, which correspond to the light and dark portions of an original document.

The decrease in contrast described above will be explained in more detail with reference to FIGS. 3A–5. In each of FIGS. 3A and 3B, we shall assume that a pixel $P_{i,n}$ disposed at the center of a plurality of aligned pixels is the pixel of an original document which corresponds to a bit thereof which is to be subjected to binary transformation. Pixels $P_{i,n-1}$ and $P_{i,n+1}$ are on the left and right sides, respectively, of pixel $P_{i,n}$ on the same scanning line i. Specifically, pixel $P_{i,n-1}$ corresponds to a bit on the document which has been subjected to binary transformation immediately before pixel $P_{i,n}$ and pixel $P_{i,n+1}$ corresponds to a bit of the document which will be subjected to binary transformation immediately after pixel $P_{i,n}$. Correspondingly, pixels $P_{i,n-2}$ and $P_{i,n+2}$ on the left and right sides, respectively, of pixel $P_{i,n}$ are pixels on the original document corresponding to a bit which was subject to binary transformation one bit before pixel $P_{i,n}$ and to a bit which will be subject to binary transformation one bit after pixel $P_{i,n}$, respectively, on the same scanning line i.

In FIG. 3A, the central pixel $P_{i,n}$ is black and the other ones are white. When the image sensor reads the central pixel, it also reads the picture information with respect to the adjacent pixels $P_{i,n-1}$ and $P_{i,n+1}$ in combination (due to poor resolution). In this case, as shown in FIG. 4A, a picture signal portion 4A (which should be at the black level) of analog picture signal 4 has a level lying between the white and black levels. Accordingly, if the level of signal portion 4A is slightly above the threshold voltage $V_{ref}$, the black picture information will be eliminated totally, as shown in FIG. 4B.

In the case where the central pixel $P_{i,n}$ is white and the other pixels are black, as shown in FIG. 3B, a picture signal portion 4B corresponding to the pixel $P_{i,n}$ is produced which has a level lying between the white and black levels as shown in FIG. 5A. If the signal level is slightly below the threshold voltage $V_{ref}$, the white picture information will be totally eliminated, as shown in FIG. 6B.

Thus, in a binary transformation apparatus in which a picture image is read by an image sensor, as the line density of the picture increases, the contrast of the picture image is lowered, which results in the risk of increasing the possibility of erroneous binary transformations of picture signals.

SUMMARY OF THE INVENTION

Thus, an object of the present invention is to provide a method of binary transformation in which binary transformations are faithfully made with respect to the portion of an original document where a change occurs in background contrast.

This and other objects of the present invention are attained by storing an analog picture signal produced from an image sensor in the form of multi-level information. Corrected multi-level information is formed with respect to a bit which is to be subjected to binary transformation on the basis of a relation between the bit to be transformed and a bit adjacent thereto. The corrected multi-level information is transformed into binary information.

BRIEF DESCRIPTION OF THE DRAWINGS

The structure and teachings of the present invention will become more apparent upon a detailed description of the preferred embodiments thereof. In the description to follow, reference will be made to the accompanying drawings, in which:

FIGS. 4(a–b) show waveforms illustrating the results of conventional binary transformation processing when the pixels shown in FIG. 3A are read;

FIGS. 5A and 5B show waveforms illustrating the results of binary transformation processing when the pixels shown in FIG. 3B are read;

DETAILED DESCRIPTION OF THE PREFERRED EMBODIMENTS

Figure 1:
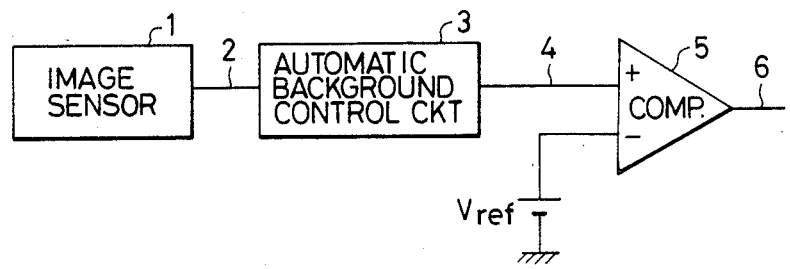
FIG. 1 is a block diagram of a method of binary transformation in a conventional reading apparatus.
Figure 2:
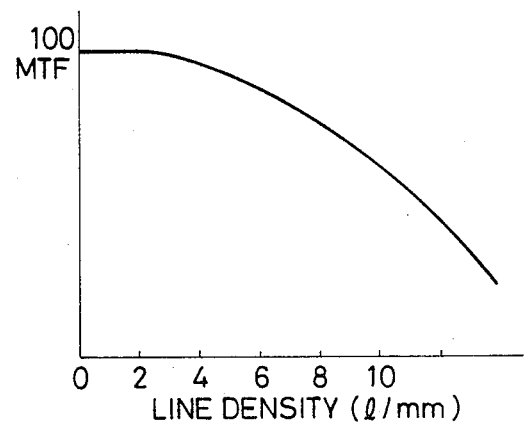
FIG. 2 is a graph showing the total resolution characteristic of a lens and an image sensor according to the method of binary transformation of FIG. 1.
Figure 3A:
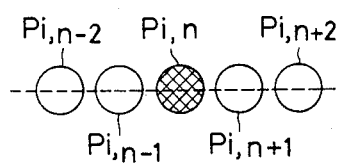
FIG. 3A shows a black pixel aligned with white pixels on the same scanning line.
Figure 3B:
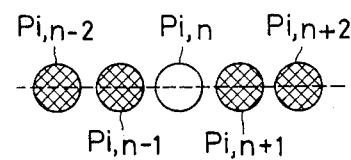
FIG. 3B shows a white pixel aligned with black pixels on the same scanning line.
Figure 6:
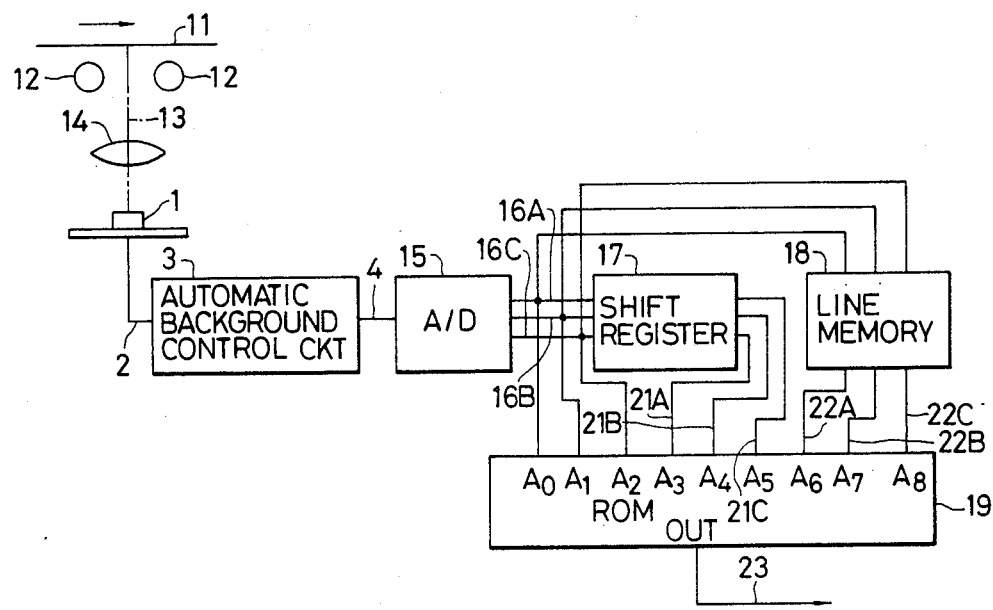
FIG. 6 is a block diagram of a reading apparatus of the first embodiment of the invention used to effect a method of binary transformation.

FIG. 6 shows the configuration of an original document reading apparatus according to a first embodiment of the present invention. An original document 11 is conveyed in the sub-scanning direction as indicated by the arrow in the drawing. Document 11 is subjected to slit exposure by a pair of fluorescent lamps 12 arranged in the main-scanning direction. A light ray 13 reflected from the original document 11 is focused by a lens system 14 onto an image sensor 1. An analog picture signal 2 produced by the image sensor 1 is subjected to signal level adjustment by an automatic background control circuit 3. After signal-level adjustment, the analog picture signal 4 is applied to an analog-to-digital (A/D) converter 15. The A/D converter 15 classifies the analog picture signal 4 into eight tones (or levels) in accordance with the brightness of the original document, and produces a digital signal of three bits 16A-16C.

Figure 7:
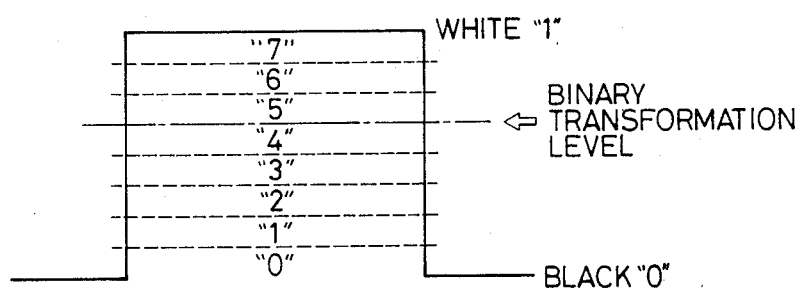
FIG. 7 is a diagram for explaining the relation between the eight tone expression of the pixel information and a binary transformation level.

FIG. 7 shows the relationship between the eight tones corresponding to the brightness of the original document and the binary transformation level. The analog picture signal produced from the automatic background control circuit 3 (FIG. 6) is classified in terms of one of the eight tones which range from pure black to pure white. The classified signal is then corrected in terms of its tone with respect to the adjacent pixel. If the corrected level is within the tone range from "0" to "4", the pixel is judged as a black one; if the corrected level is within the tone range of "5" to "7", the pixel is judged as a white one.

Figure 8:
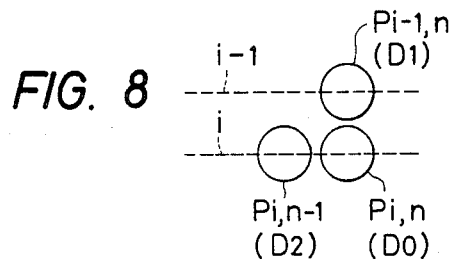
FIG. 8 is a diagram showing the pixel arrangement used for binary transformation in the first embodiment.

FIG. 8 shows pixels which are to be subjected to binary transformation. According to the first embodiment of the invention, adjacent pixels $P_{i,n-1}$ and $P_{i-1,n}$ are used for correction with respect to the pixel $P_{i,n}$. Pixel $P_{i,n}$ on the scanning line i corresponds to the bit which is to be subjected to binary transformation; pixel $P_{i,n-1}$ is the pixel disposed to the left of pixel $P_{i,n}$ which is on the same scanning line i as the pixel $P_{i,n}$; and pixel $P_{i-1,n}$ is disposed on the scanning line $i-1$ directly above the scanning line i. As shown in FIG. 6, the three bit digital signal 16A-16C is applied to a shift register 17 and a line memory 18, and is thus delayed by one bit and by one line respectively. The three-bit digital signal 16A-16C for pixel $P_{i,n}$ (which is not delayed) is applied to input terminals $A_0$-$A_3$ of a read only memory 19. Three-bit digital signal 21A-21C which has been delayed by one bit is applied to input terminals $A_3$-$A_5$ of the ROM 19 as the information corresponding to the pixel $P_{i,n-1}$. Finally, three-bit digital signal 22A-22C which has been delayed by one line is applied to input terminals $A_6$-$A_9$ of the ROM 19 as the information of the pixel $P_{i-1,n}$.

The ROM 19 serves to determine the change in tone between the pixels $P_{i,n}$, $P_{i,n-1}$ and $P_{i-1,n}$. These amounts of change in tone are then added to the tone of the concerned pixel $P_{i,n}$. That is, a digital addition of the tone changes is made in accordance with the binary signals applied to the input terminals $A_0$-$A_8$. Assuming now that the respective tones of the pixels $P_{i,n}$, $P_{i-1,n}$ and $P_{i,n-1}$ are represented by $D_0$, $D_1$ and $D_2$, the correction of these tones may be expressed by the following equation (1):

$$D' = D_0 + (D_0 - D_1) + (D_0 - D_2) \\ = 3D_0 - D_1 - D_2 \quad (1)$$

where the tone D' is a corrected value of the tone which has been read with respect to pixel $P_{i,n}$. The corrected tone D' is then subjected to binary transformation with the binary level as shown in FIG. 7. ROM 19 subsequently produces an output signal at its output terminal OUT as a binary signal 23 of either a level of "1" (white level) or a level of "0" (black level).

Table 1 shows examples of the relationships between the signals applied to the input terminals $A_0$-$A_8$ of the ROM 19 and the binary signal 23 produced from the output terminal OUT. The mark * in the Table 1 represents all the possible combinations of the bit one bit before ($A_3$-$A_5$) or the bit one line before ($A_6$-$A_8$).

TABLE 1

| Concerned Bit | | | Bit 1-bit Before | | | Bit 1-line Before | | | Output |
|---|---|---|---|---|---|---|---|---|---|
| $A_0$ | $A_1$ | $A_2$ | $A_3$ | $A_4$ | $A_5$ | $A_6$ | $A_7$ | $A_8$ | OUT |
| 0 | 0 | 0 | * | | | * | | | 0 |
| 0 | 0 | 1 | | | | | | | 0 |
| 0 | 1 | 0 | 0 | 0 | 0 | 0 | 0 | 0 | 1 |
| 0 | 1 | 0 | 0 | 0 | 0 | 0 | 0 | 1 | 1 |
| 0 | 1 | 0 | 0 | 0 | 0 | 0 | 1 | 0 | 0 |

Figure 9A:
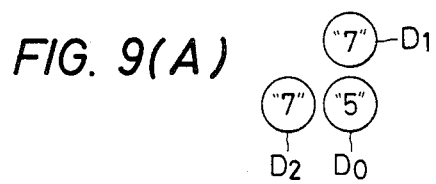
FIGS. 9(A-C) are diagrams of particular examples of the tones which have been read with respect to respective pixels.

Particular examples now will be described. In the case where the relation in tone between the concerned bit and the adjacent bit is as shown in FIG. 9A, the tone D' is derived from equation (1) as:

$$D' = 3 \times 5 - 7 - 7 = 1 \text{ (black)}$$

That is, a black pixel $D_0$ distributed among white pixels $D_1$ and $D_2$ is correctly judged as a black pixel.

Figure 9B:
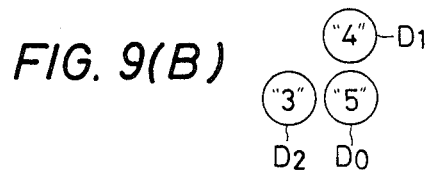

In the case of tone relation as shown in FIG. 9B, the tone D' is calculated as follows:

$$D' = 3 \times 5 - 4 - 3 = 8 \text{ (white)}$$

That is, a white pixel $D_0$ distributed among black pixels $D_1$ and $D_2$ is correctly judged as a white pixel.

Figure 9C:
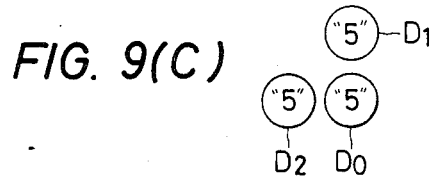

Further, in the case of tone relation as shown in FIG. 9C, the tone D' is as follows:

$$D' = 3 \times 5 - 5 - 5 = 5 \text{ (white)}$$

That is, three white pixels locally existing among black pixels are correctly judged as a white pixel.

Figure 11:
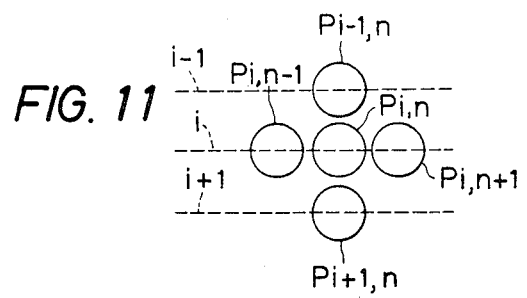
FIG. 11 is a block diagram of pixel arrangement illustrating pixels used for binary transformation in the second embodiment of the invention.
Figure 10:
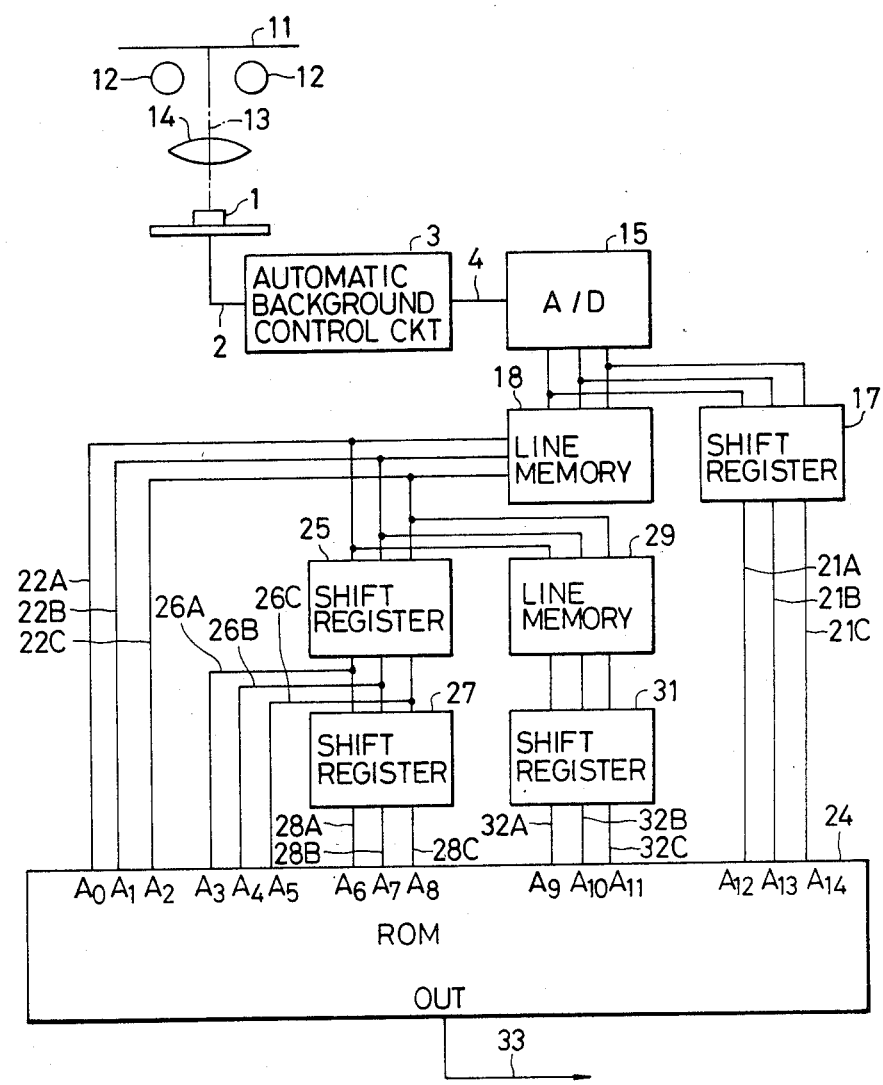
FIG. 10 is a block diagram of a second embodiment of the present invention.

FIG. 10 shows a second embodiment of the present invention. In FIGS. 10 and 6, like reference symbols connote like structures. In the document reading apparatus of FIG. 10, digital signals are applied to input terminals $A_0$-$A_{14}$ of a ROM 24. A three-bit digital signal 22A-22C, which has been delayed by one line by a line memory 18, is applied to the first three terminals $A_0$-$A_2$ of the input terminals $A_0$-$A_{14}$. This three-bit digital signal 22A-22C corresponds to a pixel $P_{i,n-1}$ in FIG. 11. Further, a three-bit digital signal 26A-26C, which has been delayed by one bit by a shift register 25, is applied to the next three input terminals $A_3$-$A_5$. This three-bit digital signal 26A-26C corresponds to a pixel $P_{i,n}$ of FIG. 11 which is to be subjected to binary transformation. A three-bit digital signal 28A–28C, which is obtained by delaying the three-bit signal 26A–26C by one bit by a shift register 27, is applied to the next three input terminals $A_6$–$A_8$ of the ROM 24. This three-bit digital signal 28A–28C corresponds to a pixel $P_{i,n+1}$ which will be subjected to binary transformation immediately after pixel $P_{i,n}$. A three-bit digital signal 32A–32C, which is obtained by delaying the three-bit digital signal 22A–22C by a line memory 29 and by one bit by a shift register 31, is applied to the next three input terminals $A_9$–$A_{11}$ of the ROM 24. This three-bit digital signal 32A–32C corresponds to the adjacent pixel $P_{i+1,n}$ on the scanning line (i+1) immediately above the scanning line i in which binary transformation is to be effected. Finally, a three-bit digital signal 21A–21C produced from a shift register 17 is applied to the three input terminals $A_{12}$–$A_{14}$ of the ROM 24. This three-bit digital signal 21A–21C corresponds to the adjacent pixel $P_{i-1,n}$ on the scanning line (i−1) immediately before scanning line i, as shown in FIG. 11.

Thus, in the second embodiment of the present invention as shown in FIG. 10, an information bit currently read is judged as to whether it contains white or black information on the basis of the respective tones which have been read with respect to the four pixels adjacent thereto, thereby producing a binary signal 33 from the output terminal OUT of the ROM 24. In this manner, the tone correction of a given pixel can be even more accurately derived than the tone correction of the embodiment shown in FIG. 6. ROM 24 operates on the same correction equation as does ROM 19 in the embodiment of FIG. 6. In this regard, it is to be understood that any hardware which can reproduce the correction equation method of the ROM 24 can be used to effect the binary transformation of the invention.

As explained above, it is possible to obtain a noiseless, high quality binary image according to the present invention. According to the invention, an analog picture signal is digitalized in terms of a multi-level signal and binary transformation is made with respect to the picture information on the basis of the multi-level signal thereof.

What is claimed is:

1. A binary transformation method for a reading apparatus, said reading apparatus comprising a photoelectric element for scanning a portion of an original document comprising a plurality of pixels, each of said pixels having a discrete image, and means for converting an analog picture signal into a discrete level signal such that the image of each pixel is expressed in terms of a discrete level of a multi-level signal, said method comprising the steps of:

scanning a plurality of pixels $P_1, P_2 \ldots P_N$ on said document and producing a plurality of analog signals indicative of the images thereof;

converting said plurality of analog picture signals of pixels $P_1, P_2 \ldots P_N$ into a plurality of discrete-level signals of said pixels $P_1, P_2 \ldots P_N$;

delaying said discrete-level signals of pixels $P_1, P_2 \ldots P_N$;

scanning a pixel $P_0$ on said document to be binary transformed and producing an analog picture signal indicative of the image thereof;

converting said analog picture signal of pixel $P_0$ into a discrete-level signal;

reading out said delayed discrete-level signals;

comparing said discrete-level signals of pixel $P_0$ with said discrete-level signals of pixels $P_1, P_2 \ldots P_N$, and correcting said discrete-level signal of pixel $P_0$ accordingly; and converting said corrected discrete-level signal of pixel $P_0$ into a binary signal;

wherein said discrete levels of said discrete-level signals are selected from a group of discrete levels D ranging from a low level $X_L$ to a high level $X_H$;

wherein said discrete-level signal of said pixel $P_0$ has a level of $D_0$ and the plurality of discrete-level signals of said pixels $P_1, P_2 \ldots P_N$ have levels $D_1, D_2 \ldots D_N$, respectively, and wherein said step of comparing said discrete-level signals and correcting said discrete-level signal of said pixel $P_0$ further comprises:

determining the differences between the level $D_0$ of the discrete-level signal of pixel $P_0$ and each of the levels $D_1, D_2 \ldots D_N$ of the discrete-level signals of pixels $P_1, P_2 \ldots P_N$;

adding said differences to said level $D_0$ to produce a level sum; and assigning a new level D′ to said discrete-level signal of pixel $P_0$, said new level D′ being equal to said level sum.

2. The binary transformation method of claim 1, wherein said plurality of pixels $P_1, P_2 \ldots P_N$ are immediately adjacent to said pixel $P_0$.

3. The binary transformation method of claim 1, wherein $X_L=1$ and $X_H=7$, and wherein said step of converting said corrected discrete-level pixel $P_0$ into a digital signal comprises:

comparing said level D′ of said discrete-level signal of pixel $P_0$ to a level $D_C=5$, said signal of pixel $P_0$ being converted to a low value if D′<$D_C$ and to a high value if D′≧$D_C$.

4. The binary transformation method of claim 1, wherein said level $X_L=1$ corresponds to a black image and level $X_H$ corresponds to a white image.

* * * * *